United States Patent
DeMent et al.

(10) Patent No.: US 7,270,711 B2
(45) Date of Patent: Sep. 18, 2007

(54) NOZZLE FOR USE IN ROTATIONAL CASTING APPARATUS

(75) Inventors: R. Bruce DeMent, Lemont, IL (US); Paul Werstler, Evergreen Park, IL (US); Robert G. Snyder, III, Homer Glen, IL (US)

(73) Assignee: Kastalon, Inc., Alsip, IL (US)

( * ) Notice: Subject to any disclaimer, the term of this patent is extended or adjusted under 35 U.S.C. 154(b) by 242 days.

(21) Appl. No.: 10/862,248

(22) Filed: Jun. 7, 2004

(65) Prior Publication Data

US 2005/0268843 A1    Dec. 8, 2005

(51) Int. Cl.
*B05B 1/00* (2006.01)
*B05B 13/02* (2006.01)
*B05C 5/00* (2006.01)
*B29C 47/12* (2006.01)

(52) U.S. Cl. .................. 118/300; 118/320; 118/319; 239/553.5; 425/461

(58) Field of Classification Search ............... 118/319, 118/320, 300; 239/589.592, 597, 553.5; 425/461
See application file for complete search history.

(56) References Cited

U.S. PATENT DOCUMENTS

| | | | |
|---|---|---|---|
| 873,301 A | 12/1907 | Cummings et al. | |
| 2,122,703 A | * 7/1938 | Weinreich | .................. 425/461 |
| 2,945,739 A | 7/1960 | Lehmicke | |
| 3,834,629 A | 9/1974 | Hellman et al. | |
| 4,017,240 A | * 4/1977 | Nelson | .................. 425/192 R |
| 4,055,302 A | * 10/1977 | Hruby, Jr. | ................ 239/589.1 |
| 4,141,507 A | 2/1979 | Rump | |
| 4,151,955 A | 5/1979 | Stouffer | |
| 4,300,723 A | 11/1981 | Prasthofer | |
| 4,466,854 A | 8/1984 | Hawerkamp | |
| 4,494,698 A | 1/1985 | Brown et al. | |
| 4,565,515 A | 1/1986 | Maier | |

(Continued)

OTHER PUBLICATIONS

"Rolls and Rollers with Baytec-Reactive Coating", FKM Walzentechnik GmbH.

(Continued)

*Primary Examiner*—Yewebdar Tadesse
(74) *Attorney, Agent, or Firm*—Much, Shelist, Freed; Milton S. Gerstein

(57) ABSTRACT

For use in a rotational casting machine used for coating a rotating body with elastomer, such as polyurethane, there is provided a nozzle used for dispensing the liquid polyurethane onto the rotating body to be coated. The nozzle of the invention has a plurality of liquid-flow interior discharge-passageways each of which has an inlet connected to a sub-branch tube, which sub-branch tube is, in turn, is fluidly connected to a main branch that, in turn, is connected to a main inlet-passageway having the inlet that is directly connected to mixing head. Each discharge-passageway, or exit-passageway, changes in cross-sectional shape along the longitudinal axis thereof from its inlet to its outlet such that the cross-sectional area from the inlet to the outlet thereof gradually and minimally increases, whereby at least substantial laminar flow of the liquid is achieved with the concomitant reduced dwell-time of the liquid therein, in order to reduce in-nozzle reaction and subsequent clogging of the nozzle. The exit of the nozzle itself is constituted by the plurality of spaced-apart exit-openings or outlets of the discharge-passageways, where each such exit-opening or outlet is formed as a narrow, elongated slit or opening.

24 Claims, 4 Drawing Sheets

U.S. PATENT DOCUMENTS

| | | |
|---|---|---|
| 4,689,003 A | 8/1987 | Schreiner et al. |
| 4,721,251 A | 1/1988 | Kondo et al. |
| 4,741,286 A | 5/1988 | Itoh et al. |
| 4,758,397 A | 7/1988 | Schreiner et al. |
| 4,801,955 A | 1/1989 | Miura et al. |
| 4,852,773 A | 8/1989 | Standlick et al. |
| 4,982,896 A | 1/1991 | Crow |
| 5,028,006 A | 7/1991 | DeWinter et al. |
| 5,031,426 A | 7/1991 | Wilson |
| 5,470,515 A | 11/1995 | Grimm et al. |
| 5,490,554 A | 2/1996 | Moritz |
| 5,587,117 A | 12/1996 | Eisen et al. |
| 5,601,881 A | 2/1997 | Grimm et al. |
| 5,658,386 A | 8/1997 | Grimm et al. |
| 5,704,982 A | 1/1998 | Oudard et al. |
| 5,895,689 A | 4/1999 | Gajewski |
| 5,895,806 A | 4/1999 | Gajewski |
| 5,902,540 A | 5/1999 | Kwok |
| 6,394,369 B2 | 5/2002 | Goenka et al. |
| 6,464,154 B1 | 10/2002 | Heaslip et al. |
| 2005/0031854 A1 * | 2/2005 | Lorenz et al. .............. 428/332 |

OTHER PUBLICATIONS

"Baytec Reactive Elastomers", Mobay Corp..
"Ribbon Flow Systems", Uniroyal Chemical Co., Inc.
"Baytec High Reactice Elastomer -Baytech Roll Covering, Baytec HRE-829", Mobay Corp.
"Ribbon Flow Systems-Presentation to Kastalon", May, 2001.

* cited by examiner

NOZZLE FOR USE IN ROTATIONAL CASTING APPARATUS

CROSS REFERENCE TO RELATED APPLICATIONS

Reference is had to commonly-owned applications Ser. No. 10/646,343 filed on Aug. 22, 2003 now U.S. Pat. No. 6,989,861 and Ser. No. 10/659,732 filed on Sep. 10, 2003, now U.S. Pat. No. 7,041,171 which applications are incorporated by reference herein.

BACKGROUND OF THE INVENTION

The present invention is directed to a nozzle for use in a rotational casting machine used for applying one or more coats of liquid elastomer, such as polyurethane, to a rotating body, such as a pipe, cylinder, and the like, whereby an elastomer covering or coating is applied to the exterior or interior of the pipe, cylinder, or the like. The body being coated may be used in steel or paper mills, or many other industries, in order to protect the body proper during end-use, as well as for providing other desired properties. Rotational casting machines, that rotationally mount a body to be coated with polyurethane or other liquid elastomer, are disclosed, for example, in U.S. Pat. Nos. 5,601,881 and 5,658,386—Grimm, et al., and include a translational and vertically-adjustable mixing head in which is formed the polyurethane to be used for coating the body. Polyurethane chemicals such as polyols, isocyanates, catalysts, etc. are metered to the mixing head. In this process the liquid materials are dispensed onto the body being coated and react very quickly to produce the solid polyurethane that will cover or coat the body. The hardness of the elastomer-coating is controlled by the types of polyols used and their mixture-ratio, along with the corresponding adjustment of the amount of isocynate added to the mixture in the mixing head, in order to obtain hardness in both Shore A to Shore D ranges. The hardness desired for the elastomer depends upon many factors, such as end-use of the body being coated.

A considerable problem with rotational casting machines is the trade-off of forming a liquid polyurethane having a desired viscosity and reactivity in order to prevent run-off or dripping of the applied elastomer from the body being coated during the coating process, and the need to prevent the clogging of the dispensing head attached to, and forming part of, the mixing head during the coating-application process. If the viscosity is made too great or reactivity too fast, then the dispensing head tends to become clogged faster, requiring more frequent down-time in order to unclog and clean the dispensing head. Presently-used dispensing heads, such as that disclosed in above-mentioned U.S. Pat. Nos. 5,601,881 and 5,658,386, are sheet-die extruders or nozzles, which sheet-die nozzles are provided with an exit slot the width of the nozzle, in order to ensure that a wider swath of coat-application is applied. However, the problem with these prior-art dispensers is that each hypothetical section of the liquid elastomer exiting the dispensing head at the exit thereof has not, typically, had the same dwell-time in the dispensing nozzle along the width and the length thereof, whereby there is not ensued that the exothermically formed elastomer has the same properties throughout when applied to the body to be coated. Minimum dwell-time and uniform discharge from the nozzle in order to ensure equality and sameness of properties throughout is a highly desirable property in order to prevent build up, hardening or curing of the liquid elastomer therein and the concomitant clogging of the nozzle and exterior build up of whiskers or "stalactites" due to differential residence-time of the material in the nozzle. Moreover, the height and width of the slit of these sheet-die nozzles are dependent upon the viscosity and/or the reactivity of the material being dispensed, thus necessitating the replacement of one sheet-die with another one having a different slit-height and slit-width when materials of differing viscosity/reactivity are used. However, even changing sheet-dies in order to accommodate materials of different viscosity/reactivity in order to prevent frequent clogging of the sheet-die in order to obtain the desired coating thickness, has still not solved the problem of the frequent clogging and associated frequent down-times when sheet-die nozzles are used. This may be attributed to the fact that the flow of the material in the dispensing nozzle is not laminar, causing variation in dwell-time of the liquid in the nozzle, such that the dwell-time for some segments of the liquid are greater than a required minimum, leading to at least partial solidification of those segments in the interior of the nozzle. Over time, a build-up of solidified material develops, causing clogging at or near the exit, as well as interiorly thereof which forms the build up of solidified whiskers or "stalactites" of reacted material that interferes with the material deposition on the body.

FIGS. 1A and 1B show a conventional sheet-die nozzle 10 used on a typical and conventional rotational casting machine discussed above. The sheet-die nozzle 10 includes a mixing-head attaching section 12 for securing the nozzle to a mixing head in which is contained the liquid elastomer, such as polyurethane, to be dispensed. The interior of the nozzle 10 contains a circular-cross-sectioned passageway 14 through which the liquid elastomer flows from the mixing head to the exit of the nozzle. As can be seen in FIG. 1A, the interior passageway consists of a first main line 16 which ends in an upper frustoconical-shaped entrance that immediately fluidly communicates with the exit or outlet of the mixing head. The main line 16 branches off into two branch-lines 18, 20, which terminate into a sheet-die slit opening 22, best seen in FIG. 1B, which slit-opening 22 extends substantially the full width of the nozzle-housing 10'. The exit of the sheet-die nozzle is a relatively elongated and narrow slit or opening, so that a wide swath of the liquid elastomer may be applied to the body to be coated, and to ensure that the reacting time of the liquid is sufficiently short enough so as to prevent dripping of the applied liquid off of the element to which it has been applied. If the exiting stream of liquid material were too thick, or tall, the interior portion of the reacting liquid while still in a fluid state would not have built enough viscosity to support the column height of the stream and would run or drip off the body to which it was applied. If the reactivity were adjusted to build sufficient viscosity quickly enough to support the stream column height, the stream would not be liquid enough to flow onto the precedingly-applied material and an uneven coating would result. In a typical sheet-die nozzle 10, manufactured by Bayer Corporation, the radius of the main passageway 16 is approximately 0.079 in., while the radius of each of the branch lines 18, 20 is approximately 0.059 in., while the slit-opening 22 has a height of approximately 0.020 in. It may, therefore, be seen that liquid material flow through the interior passageway 14 of the prior-art sheet-die nozzle 10 has considerable turbulent and boundary-layer flow characteristics, causing increased dwell-time of a hypothetical section of the flowing liquid material, which, in turn, causes increased clogging of the passageway 14 and slit-opening 22, since the greater the time any section of liquid material is present in the passageway 14, the greater the likelihood it will start to cure. This has, in fact, been one of the serious problems of the prior-art nozzle for rotational casting machines; that is, in a relatively short period of time, the nozzle becomes clogged and unusable, requiring the disassembly and cleaning thereof, which also causes considerable down-time to the rotational casting machine. Moreover, since the slit-opening 22 is fed by two branches feeding into the ends of the slit-opening, the liquid-material application onto to the body to be coated is ofitimes inconsistent and uneven, and is also limiting in the range that the distance the nozzle may be relative to the body to be coated.

FIGS. 2A and 2B show another prior-art type of nozzle 30 used in rotational casting machines. The nozzle 30 differs from the nozzle 10 of FIGS. 1A and 2B in that, in addition to the first main line 32, and two branch passageways 34, there are provided four sub-branches 36 with two extending from each branch 34, and eight capillaries 38, two from each sub-branch 36. Each capillary 38 ends in a circular outlet opening 38' that together constitute the dispensing outlet for the nozzle 30. Thus, rather than an elongated slit-opening as in the nozzle 10 of FIGS. 1A and 1B, a series of equally-spaced openings, such as eight, are provided, through which the flowing liquid material is dispensed, as can be seen in FIG. 2B. In a typical, prior-art nozzle 30 manufactured by Uniroyal ChemicalDivision of Crompton Corp., the diameter of the circular-cross-sectioned main line 32 and two branches 34 is approximately 0.078 in. The diameter of each sub-branch 36 is approximately 0.063 in, while the diameter of each capillary 38 is approximately 0.047 in. Each capillary terminates into an exit hole of approximately 0.031 inch in diameter. The nozzle 30, by using equally-spaced apart dispensing holes 38', has helped to overcome the drawback of uneven and inconsistent dispensing flow and application of the slit-opening 22 of the prior-art nozzle 10 of FIGS. 1A and 1B. However, the prior-art nozzle 30 has not addressed nor overcome the problem of consistent and frequent clogging of interior passageways described above with regard to the nozzle 10 of FIGS. 1A and 1B. In fact, owing to the narrowing of the outlet opening or holes 38' of the nozzle 30, in some circumstances the problem with clogging and flow-impairment has been aggravated by the prior-art nozzle 30 of FIGS. 2A and 2B.

In conjunction with the need for a relatively thin exit stream of liquid material from the nozzle to ensure adequate support for the mass of the applied liquid material to the body to be coated, the rotational speed of the body being coated, and the relative translational speed between the nozzle and rotating body, must be coordinated with the speed of the liquid material exiting from the nozzle. If the rotational speed of the rotating body were to be too great in comparison to the exit speed of the liquid material from the nozzle-exit, then the applied coat may be thinner than required, and require additional coating layers to be applied to the rotating body, reducing the efficiency of the process, and also would cause air to become entrapped in the applied liquid, causing air blisters to form, since there would not be enough time for the applied stream to push out the air between the applied stream and the surface of the rotating body. On the other hand, if the rotational speed were to slow, then productivity and efficiency of the process would be adversely affected, would also increase the likelihood of premature curing, causing the eventual clogging of the nozzle, and uneven application of the coating to the rotating body. Similarly, if the relative translational motion between the exit-nozzle and the rotating body were too great, then air blisters would form, and, in addition, an applied coating of liquid material thinner than is required and optimal would be formed. Similarly, if the relative translational motion between the exit-nozzle and the rotating body were too slow, the efficiency and productivity of the process would be adversely affected, and would also cause an applied coating that would be too thick, thus causing dripping of the applied liquid from the body being coated, as well as potentially uneven thickness of the applied coat.

The need and requirement for optimal correspondence between exit speed of the liquid from the nozzle, the thickness of the exiting stream of liquid, the rotational speed of the rotating body being coated relative to this exit speed of the liquid from the nozzle, and the relative translational speed between the nozzle and the rotating body being coated has imposed significant constraints as to linear distance the exit of the nozzle of the rotating casting machine may be from the surface of the rotating body being coated. Presently-used rotational casting machines provide an outer limit of only approximately 5 mm. of the nozzle-exit from the surface of the rotating body being coated. A distance greater than 5 mm. has been found to cause excessive clogging of the nozzle, with a concomitant increase of downtime of the machine for unclogging the nozzle. This excessive clogging ensues from the fact that as the nozzle-exit distance from the surface to be coated is increased, the exit-speed of the liquid must be increased in order to compensate therefor. The increase in speed of the liquid through the nozzle increases turbulent flow in the nozzle, thus increasing the dwell-time of the liquid in the nozzle, and the increased curing thereof in the nozzle, with the ensuing clogging of the nozzle, as discussed hereinabove. Besides the increased clogging of the nozzle, air blisters form in the applied coating of liquid, for the reasons described hereinabove due to the increased exit speed of the liquid from the nozzle-exit.

Another considerable problem with the sheet-die nozzle of FIG. 1 is that the size of the rotating body that may be coated with the liquid exiting therefrom is limited. Cylindrical bodies having a diameter less than approximately five inches have not been able to effectively coated with liquid. This is because of the requirement described above for correlation between the speed of the rotational body to be coated, the exit-speed of the liquid from the nozzle-exit, and the turbulent flow of the liquid in the nozzle proper and the increased dwell-time of the liquid in the nozzle associated therewith.

In commonly-owned copending application Ser. No. 10/646,343, filed on Aug. 22, 2003, there is disclosed an improved nozzle for a rotational casting machine, which nozzle increases the efficiency and productivity of the rotational casting machine, reduces downtime thereof, more effectively coats cylindrical bodies, is able to effectively coat cylindrical bodies of smaller diameter than hitherto possible, and is better able to prevent air-blistering of the coating. The liquid-dispensing nozzle for rotational casting machines of said copending application comprises a single liquid-flow interior passageway that changes shape along the longitudinal axis thereof from inlet to outlet, but which maintains a constant cross-sectional area throughout the changing cross-sectional shapes, whereby laminar flow occurs throughout the interior flow-passageway of the nozzle, to thus minimize the dwell-time of the liquid in the nozzle, and, thereby, considerably reduce and minimize clogging of the nozzle. The exit or outlet thereof is formed as a narrow, elongated slit or opening. However, the interior passageway of the nozzle continually changes shape from the inlet to the outlet thereof, in order to ensure a constant cross-sectional area of the interior passageway along the length thereof, and in order to arrive at the desired narrow, elongated outlet, ensuring consistent pressure of the liquid across the entire area, whereby laminar flow of the liquid is achieved with the concomitant reduced dwell-time of the liquid polyurethane therein, in order to reduce in-nozzle reaction and subsequent clogging of the nozzle.

SUMMARY OF THE INVENTION

It is the primary objective of the present invention to provide an improved nozzle for a rotational casting machine which includes a main inlet passage, a plurality of branch-passageway and sub-branch passageways, and a plurality of interior discharge-passageways, where each interior discharge-passageway of the nozzle defines an inlet-section, a main passageway section and an outlet-opening section, which main passageway section has a plurality of different cross-sectional shapes, which cross-sectional shapes increase in cross-sectional area in a direction from the inlet-section toward the outlet-opening section, which outlet-opening section terminates in an outlet opening having a substantially narrow, elongated shape.

It is also the primary objective of the present invention to provide an improved nozzle for a rotational casting machine which includes a plurality of interior discharge-passageways, where the plurality of different cross-sectional shapes initially are circular, then varying elliptical cross-sectional shapes, and finally varying elongated-like cross-sectional shapes that continually transform into the substantially elongated-like shape of the outlet.

It is also the primary objective of the present invention to provide such a plurality of interior discharge-passageways such that the exit of the nozzle of the invention defines a plurality of spaced-apart discharge or exit outlets or openings, with each discharge or exit openings having the same, slit-like shape, whereby a wider spreading of material during discharge is provided without significantly increasing flow.

Toward these and other ends, the liquid-dispensing nozzle for rotational casting machines comprises a plurality of liquid-flow interior discharge-passageways each of which has an inlet connected to a sub-branch tube, which sub-branch tube is, in turn, is fluidly connected to a main branch that, in turn, is connected to a main inlet-passageway having the inlet that is directly connected to mixing head. Each discharge-passageway, or exit-passageway, changes in cross-sectional shape along the longitudinal axis thereof from its inlet to its outlet such that the cross-sectional area from the inlet to the outlet thereof gradually and minimally increases, whereby at least substantial laminar flow of the liquid is achieved with the concomitant reduced dwell-time of the liquid therein, in order to reduce in-nozzle reaction and subsequent clogging of the nozzle. The exit of the nozzle itself is constituted by the plurality of spaced-apart exit-openings or outlets of the discharge-passageways, where each such exit-opening or outlet is formed as a narrow, elongated slit or opening.

BRIEF DESCRIPTION OF THE DRAWINGS

Reference is had to the accompanying drawings, wherein.

DETAILED DESCRIPTION OF THE INVENTION

Figure 1A:
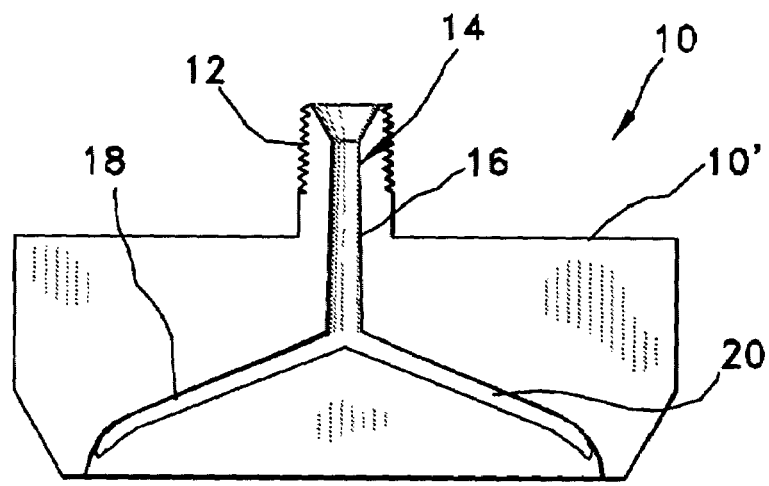
FIG. 1A is a top sectional view of a prior-art sheet-die nozzle used in a rotational casting machine.
Figure 1B:
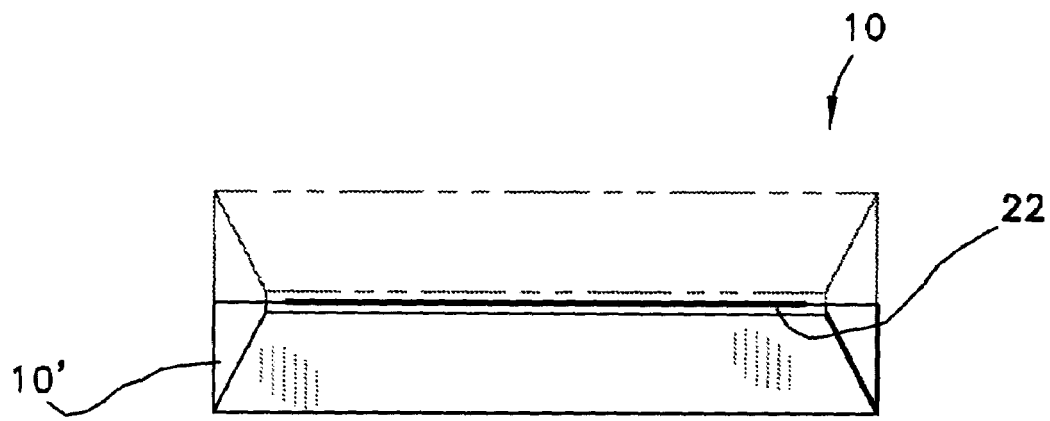
FIG. 1B is a front view thereof.
Figure 2A:
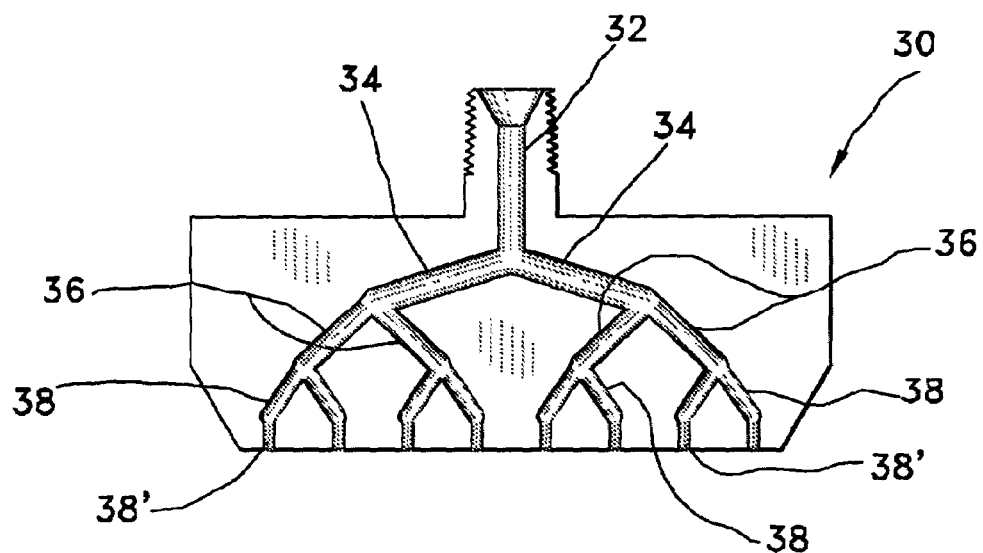
FIG. 2A is a top sectional view of another prior-art nozzle used in a rotational casting machine.
Figure 2B:
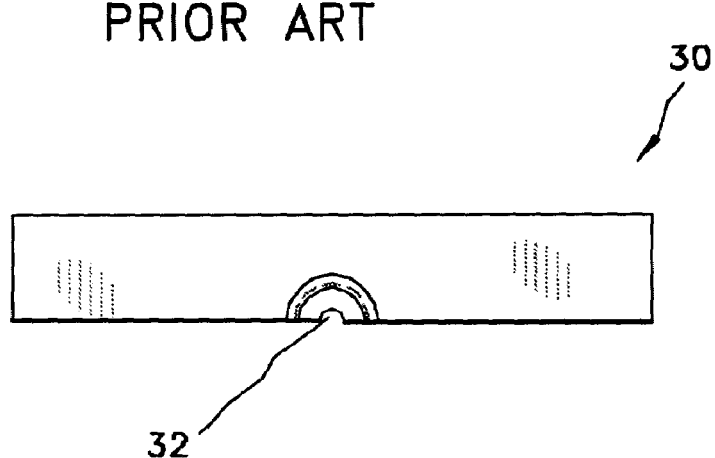
FIG. 2B is a front view thereof.
Figure 3A:
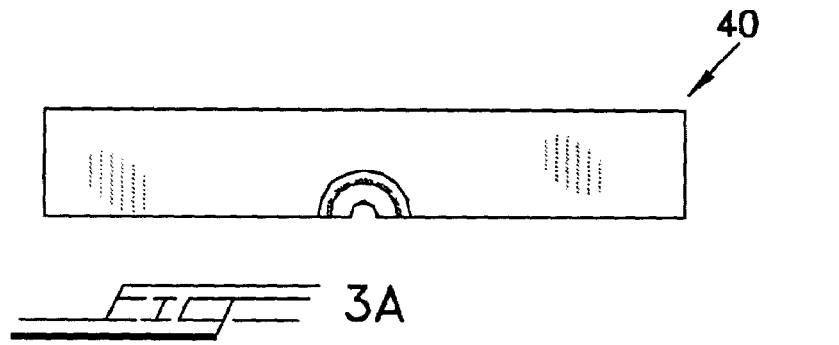
FIG. 3A is a first end view of the each half of the nozzle for a rotational casting machine of the present invention.
Figure 3C:
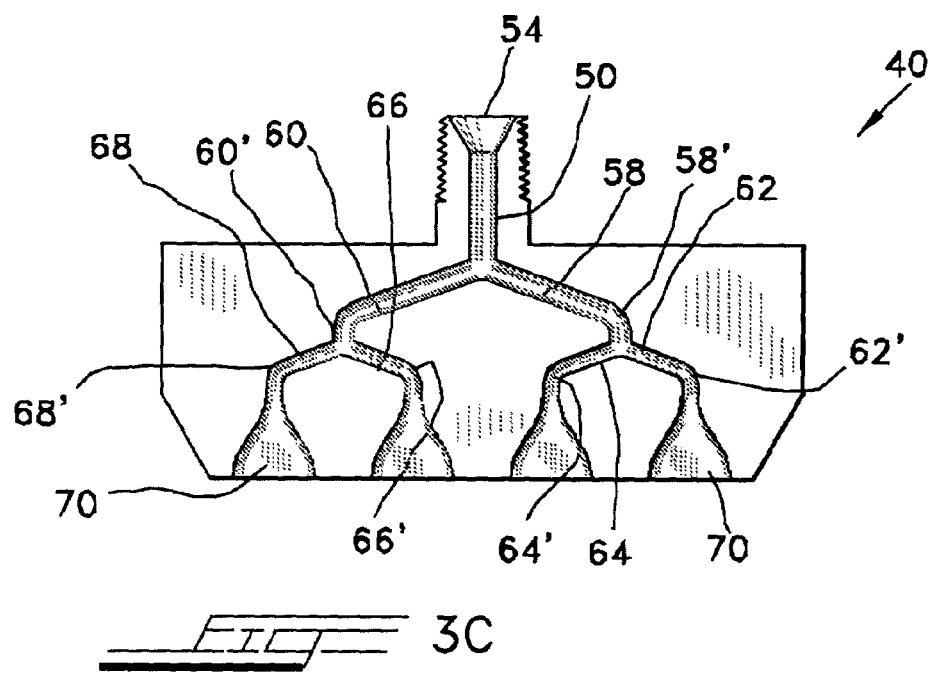
FIG. 3C is a top view thereof.
Figure 3B:
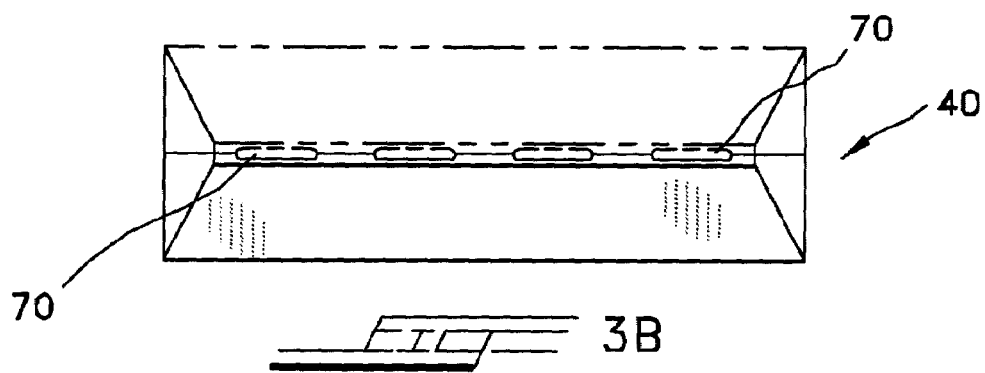
FIG. 3B is a second end view thereof.

Referring now to the drawings in greater detail, and to FIGS. 3A-3C for now, there is shown a half-section 40 of the nozzle of the present invention, it being understood that the other half-section of the nozzle of the invention is substantially identical. Each half-section 40 has a plurality of holes through which pass bolts for securing the two-halves together, with alignment pins cooperating with openings in the other-half section for initially aligning the half-sections together, in the manner described in above-mentioned copending application Ser. Nos. 10/646,343 and 10/659,732. Each half-section 40 has an upper threaded portion 46, whereby after the two half-sections have been attached, there is provided an attachment section for securing the nozzle 40 to the mixing head of a rotational casting machine in the conventional manner, in which mixing head are mixed the prepolymers for forming the polyurethane used to coat a rotating body held by the rotational casting machine.

In accordance with the nozzle of the present invention, the nozzle 40 of the invention has a central, main inlet passageway 50 that includes inlet 54, which inlet is coupled with the exit or discharge orifice of the mixing head in the conventional manner. The central passageway branches off into two main branches, or branch passageways, 58, 60. Each main branch 58, 60 has an arcuate end-section 58', 60' to enhance laminar flow, whereby each main branch 58, 60, in turn, branches off into two sub-branches 62, 64, and 66, 68, respectively, each of which, in turn, leads into a discharge-passageway 70 via arcuate end-sections 62', 64', and 66', 68', respectively, also to enhance laminar flow. Each discharge-passageway 70 is formed somewhat similarly in concept to the passageway of the above-mentioned commonly-owned, copending applications, except for the differences explained hereinbelow.

In the preferred embodiment of the invention, the main inlet passageway 50 has a circular cross section of a radius of 0.078 in., each of the main branches has a circular cross section of a radius of 0.063 in., and each of the sub-branch passageways has a circular cross section of a radius of 0.047 inch, it being understood that the dimensions are given only by way of example.

Each discharge-passageway 70 continually changes cross-sectional shape, as further described hereinbelow. The interior passageways of the nozzle 40 are so configured as to ensure that the flow of the liquid is substantially laminar therethrough. This laminar flow ensures the shortest possible dwell-time of any hypothetical element of liquid therein. Since the liquid polyurethane has been formed by exothermic reaction in the mixing head via the metered-in chemical reactants, and since the liquid has a short, reaction time once exiting the mixing head, any delay of passage through the nozzle would cause the liquid to solidify within the nozzle passageway, to cause the clogging thereof, as has been the problem with prior-art, rotational casting machine dispensing nozzles, as described hereinabove. By ensuring a substantial laminar flow throughout the length of the passageway of the nozzle of the invention, dwell time is reduced, and the concomitant reaction of the liquid and clogging of the passageway thereby is greatly reduced as compared to prior art rotational casting machine dispensing nozzles.

Figure 4B:
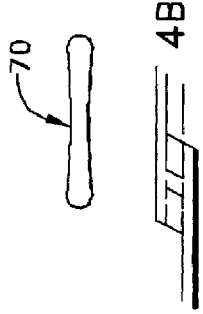
FIG. 4B is an end view of the outlet of each discharge-passageway of the nozzle of the present invention.
Figure 4C:
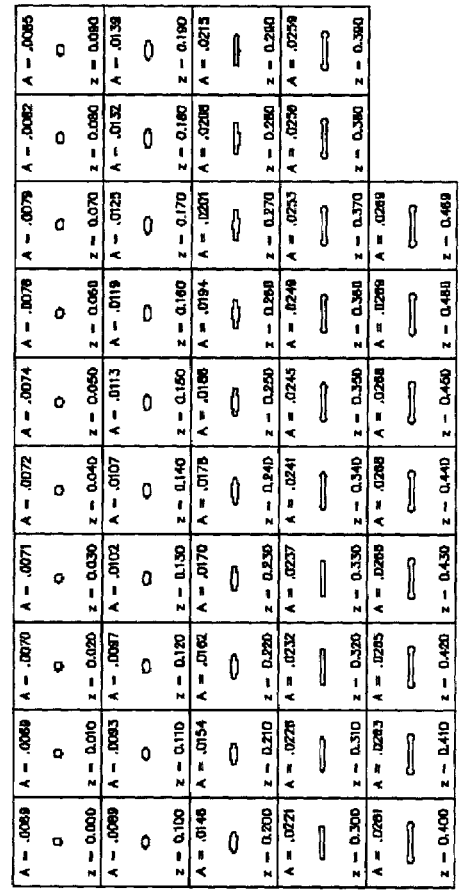
FIG. 4C is a chart showing the x-y-z coordinate-dimensions of the various cross sections of FIG. 4A.
Figure 4A:
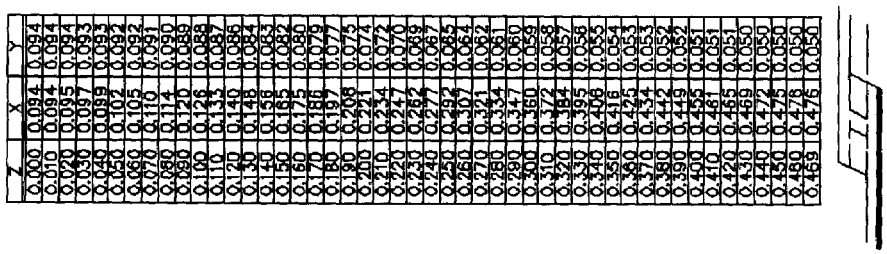
FIG. 4A is a chart showing the various transverse, cross-sectional shapes of the interior of each discharge-passageway of the nozzle of the present invention.

Referring now to FIGS. 4A-4C, the exit opening or outlet of each passageway 70 is made relatively elongated in width, in the "x" coordinate direction, yet narrow in height, in the "y" coordinate direction, as depicted in FIG. 4B, to form an elongated, slit-like outlet. Referring to FIG. 4C, there is shown a series of transverse cross-sectional views along the longitudinal axis of the passageway 70, it being noted that value "A" indicated refers to the cross-sectional area of a respective cross section. The distance along the longitudinal axis from the inlet is defined as the "z" dimension in FIGS. 4A and 4C. It is noted that while the overall length of each discharge passageway 70 is, in the preferred embedment, 0.0500 inch, the cross-sectional shapes along the discharge passageway 70 in FIG. 4C are taken over an overall length of 0.469 inch, since the 0.031 inch length before z=0 provides a transition section to double the circular radius from 0.047 of a sub-branch passageway to the 0.094 of the inlet section of the discharge-passageway 70 at z=0 in FIG. 4C.

Referring to FIG. 4A, there is shown the corresponding x, y and z dimensions for each transverse cross sections of FIG. 4C, with the outlet shown in FIG. 4B of the passageway 70 having a "z" value of 0.469 in., in the preferred embodiment where the length of the entire passageway is 0.500 in., it also being understood that the length of the passageway 70 may vary depending upon type of liquid coating being dispensed, the sizes of the outlet and inlet, and other variables that would be clear to one of ordinary skill in the art.

Unlike the internal passageway disclosed in copending application Ser. No. 10,646,343, the cross-sectional area along the internal passageway 70 is not constant. This is so because the outlet at z=0.469 is too small or narrow to pass any particulate matter in the flowing stream, which particulate matter could cause clogging of the nozzle. The main purpose of the cross-sectional pattern shown in FIGS. 4A-4C is to maintain even pressures across the nozzle cross-sections, so that, although the stream will flow more slowly as the cross-sectional area enlarges, all areas of the stream in any particular cross-section will, however, move at the same velocity, to thereby ensure laminar flow, whereby deposition of particulate, and the concomitant clogging associated therewith, is obviated. Since the transition from one cross section to another is kept to an extreme minimum, as evidenced by the minimal increase in cross-sectional area from one cross section to the next as indicated in FIG. 4C, turbulent flow at the boundary layer is for all intents and purposes is eliminated or reduced to an insignificant factor.

Referring again to FIG. 4C, the area of the transverse cross sections from z=0 until z=0.469 in increases from 0.0069 to 0.0269 at the outlet. As one progresses along the z-direction, the x-dimension increases while the y-direction decreases, to form a continual narrowing of the height of the passageway and a continual increasing of the width thereof, until finally forming the elongated, flared-end, bell-shaped, or an oval-of-Cassini shape, outlet of FIG. 4B. Thus, while at z=0 and z=0.010, the cross section is circular, subsequent cross sections tend to elongate until ever greater elliptical shapes, elongated slots, and oval-of-Cassini shapes are formed. Finally, at the outlet or exit at z=0.469, the largest cross-sectional area of an oval-of-Cassini shape is formed, in order to apply the coating over a relatively larger area. The increase in each cross-section in both the "x" and "y" directions are as minimal as possible in order to ensure that the velocity of any hypothetical cross section of the flowing liquid remains the same in that hypothetical cross section, in order to ensure as close to laminar flow as possible, in order to prevent boundary-layer turbulent flow, which turbulent flow would tend to cause deposition of particulates and subsequent clogging of the passageway. Thus, for the example shown in FIGS. 4A-4C, for the cross sections shown, there is not a greater increase in the "x" dimension from one cross section to an adjacent cross section of more than 0.015 inch which occurs between z=0.230 until z=0.260. The absolute difference in increase in the value of the "x" dimension gradually increases from z=0.020 from a difference of 0.001 to the above-mentioned maximum of 0.015, with such difference going in stages from the above-mentioned 0.001 at z=0.020, to a difference of 0.002 between z=0.020 and z=0.040, and then increases to 0.003 from z=0.040 to z=0.060, temporary increases to 0.005 between z=0.060 and z=0.070, and then decreases to 0.004 from z=0.070 and z=0.080, and then increases to 0.006 between z=0.080 and z=0.100, and the increases to 0.007 from z=0.100 to z=0.120, increases to 0.008 from z=0.120 to z=0.140, increase to 0.009 from z=0.140 to z=0.150, increases to 0.010 from z=0.150 to z=0.160, increases to 0.011 from z=0.160 until z=0.190, increases to 0.013 from z=0.190 until z=0.220, increases to the above mentioned maximum of 0.015 from z=0.190 until z=0.260, and then starts to decrease until the outlet, such that the difference is 0.014 at z=0.260 until z=0.270, and then decreases to 0.013 between z=0.270 until z=0.300, decreases to 0.012 from z=0.300 until 0.320, decreases again to 0.011 at z=0.320 until z=0.340, decreases to 0.010 from z=0.340 to z=0.350, decreases to 0.009 from z=0.350 to z=0.370, and then decreases to 0.0089 from z =0.370 until z=0.380, decreases to 0.007 from z=0.380 to z=0.390, decreases to 0.006 from z=0.390 until z=0.410, decreases to 0.004 from z=0.390 until z=0.430, decreases to 0.003 from z=0.430 until z=0.450, and then drop to 0.001 from z=0.450 to z=0.460, with no change from z=0.450 to the actual outlet at z=0.469. For the "y" dimension, this value continually diminishes from one "z"-value cross section to the next such that the difference in the "y" dimension from one "z"-value cross section to the next is only 0.001 or 0.002 inch for most sections, while only a few adjacent "z"-value cross sections have the same "y" value. These gradual and minimal changes in the "x" and "y" dimensions provide a passageway 70 that has the difference in cross-sectional area values between adjacent cross sections of the main passageway section gradually increasing to a maximum at an approximate medial portion of the main passageway section between the inlet and outlet opening, which difference in cross-sectional area values then gradually decreases from this approximate medial portion of the main passageway section until the outlet opening. These gradual and minimal changes in the "x" and "y" dimensions, and in the difference in cross-sectional area values between adjacent cross sections in the "z" direction toward the outlet opening, ensures the above-described constant velocity, the laminar flow, and substantial negation of boundary-layer turbulent flow.

It is to be understood that the length of the passageway 70 and the number thereof may vary depending on a number of factors, such as the type of pre-polymers used, the specific liquid elastomer applied, the size and type of body to be coated, and the like. The length of the passageway 70 described above has been given by way of example only, and is not meant nor intended to be limiting. Moreover, the actual various cross-sectional shapes in the interior passageway 70 shown in the drawings and discussed hereinabove, are shown by way of example, and is not intended to exclude other shapes and cross-sectional areas. Similarly, it is to be understood that the radius of each of the main passageway 50, the branches 58, 60 and the sub-branches 62, 66, 66, and 68 have been only by way of example, and are not intended to be limiting. Also, the number of branches 58 and 60, and sub-branches 62, 64, 66, 68 used, may be different from that shown in the drawing and discussed above. For example more than two branch-passageways 58, 60 may be used, with concomitant greater number of sub-branches employed. Moreover, for certain end-uses, capillary passageways connecting the sub-branches 62, 64, 66, 68 to discharge-passageways 70 may be employed.

The dispensing nozzle described hereinabove may have applications and uses in machines other than rotational casting apparatuses, and may also have application and use in the dispensing of other fluids, whether liquid or gas, and not just elastomers. Moreover, in some of these other applications and uses, the discharge-passageway 70 may be used as the sole and only dispensing passageway, it being understood that the length thereof and the cross-sectional areas thereof will vary depending upon end-use.

For the example given above, with the cross-sectional shapes and dimensions shown in the FIGS. 4A-4C, the following algorithm describes the interior passage 70.

"Algorithm"

The inlet and outlet cross-sections are both considered to be in x-y planes, separated by a distance dz in the z-axis, where each point on the inlet is matched up with a point on the outlet.

Pseudocode

For each z in the range $\{z_{inlet} \ldots z_{outlet}\}$ $t=(z-z_{inlet})/(z_{outlet}-z_{inlet})$ If t is in the range {0 . . . 0.5}, then $p=t^2$ If t is in the range {0.5 . . . 1.0}, then $p=1-2\cdot(1-t)^2$ For each (x, y) point in the inlet/outlet profiles, $x=(1-p)\cdot x_{inlet}+p\cdot x_{outlet}$ $y=(1-p)\cdot y_{inlet}+p\cdot y_{outlet}$ Next (x, y) point Next z Visual Basic for Applications—AutoCAD 2000i Code
Public Function GetInterpolatedLWPolyline(lwp1 As AcadLWPolyline, lwp2 As
AcadLWPolyline, t As Double) As AcadLWPolyline
  Dim p As Double, s As Double
  If t<=0.5 Then $p=2*t^2$ Else $p=1-2*(1-t)^2$ End If
  Dim dblPt( ) As Double
  ReDim dblPts(UBound(lwp1.Coordinates))
  Dim idx As Integer
  For idx=0 To UBound(lwp1.Coordinates) Step 2 x1=lwp1.Coordinates(idx)

y1=lwp1.Coordinates(idx+1)

x2=lwp2.Coordinates(idx)

y2=lwp2.Coordinates(idx+1)

dblPts(idx)=$p*x2+(1-p)*x1$ dblPts(idx+1)=$p*y2+(1-p)*y1$

Next idx
  Set GetInterpolatedLWPolyline=ThisDrawing.ModelSpace.AddLightWeightPolyline(dblPts)

End Function
  Copyright Kastalon, Inc. 2004

While a specific embodiment of the invention has been shown and described, it is to be understood that numerous changes and modifications may be made therein without departing from the scope and spirit of the invention as set forth in the appended claims.

What is claimed is:

1. In a rotational casting apparatus for coating a body with an elastomer comprising a main frame for supporting a body to be coated with elastomer, a mixing head in which a liquid elastomer is contained, and dispensing means operatively connected with said mixing head for dispensing liquid elastomer onto a body to be coated supported by said main frame, the improvement comprising:

said dispensing means comprising nozzle means having interior flow passageway means through which the liquid elastomer from said mixing head flows;

said interior flow passageway means comprising a plurality of discharge-passageways, each said discharge-passageway defining a longitudinal axis along the length thereof defined as the "z" axis, and having a main passageway section and an outlet-opening section; said main passageway section comprising a plurality of regions of different cross-sectional shapes, each said region having a series of similarly-shaped cross sections, said cross sections of said plurality of regions of different cross-sectional shapes generally increasing in cross-sectional area in a direction toward said outlet-opening section for at least a number of said cross sections along the length of said discharge-passageway;

said outlet-opening section comprising an outlet opening having a substantially elongated-like shape;

each said cross section of each said series of similarly-shaped cross sections of said plurality of regions of different cross-sectional shapes being defined by a width "x" and a height "y"; the "x" dimension of at least most of said cross sections of each said series of similarly-shaped cross sections of said plurality of regions of different cross-sectional shapes increasing in value along the "z" direction toward said outlet opening, and the "y" dimension of at least most of said cross sections of each said series of similarly-shaped cross sections of said plurality of regions of different cross-sectional shapes decreasing in value along the "z" direction toward said outlet opening.

2. The rotational casting apparatus for coating a body with an elastomer according to claim 1 wherein said plurality of regions of different cross-sectional shapes comprise a first series of elliptical cross-sectional shapes and a second series of elongated-like cross-sectional shapes that continually transform in a direction along said longitudinal axis into said substantially elongated-like shape of said outlet opening.

3. The rotational casting apparatus for coating a body with an elastomer according to claim 2, wherein said plurality of regions of different cross-sectional shapes further comprise a third series of circular cross-sectional shapes.

4. The rotational casting apparatus for coating a body with an elastomer according to claim 3, wherein said third series of circular cross-sectional shapes precede said first and second series of cross-sectional shapes in said "z" direction.

5. The rotational casting apparatus for coating a body with an elastomer according to 3, wherein said plurality of regions of different cross-sectional shapes further comprise a fourth series of cross-sectional shapes of substantially oval-of-Cassini-like shape.

6. The rotational casting apparatus for coating a body with an elastomer according to claim 5, wherein said outlet opening is an oval-of-Cassini-like shape.

7. The rotational casting apparatus for coating a body with an elastomer according to claim 1, wherein said interior flow passageway means comprises a first inlet passageway having a first inlet connected to said mixing head and a second outlet, a plurality of branch-passageways each having a second inlet connected to said first outlet of said first inlet passageway and a second outlet; each said discharge-passageway of said plurality of discharge-passageways having a third inlet in fluid communication with a said second outlet of a respective said branch-passageway.

8. The rotational casting apparatus for coating a body with an elastomer according to claim 7, wherein said interior flow passageway means further comprises a plurality of sub-branch passageways each having a fourth inlet connected to a said second outlet of a respective said branch-passageway, and a fourth outlet connected to a said third inlet of a respective said discharge-passageway, each said sub-branch passageway providing said fluid communication between a said third inlet of a respective said discharge-passageway and a said second outlet of a respective said branch-passageway.

9. A dispensing nozzle comprising:
at least one interior flow passageway through which fluid flows;
said at least one interior flow passageway comprising a plurality of discharge-passageways, each said discharge-passageway defining a longitudinal axis along the length thereof defined as the "Z" axis, and having a main passageway section and an outlet-opening section; said main passageway section comprising a plurality of regions of different cross-sectional shapes, each said region having a series of similarly-shaped cross sections, said plurality of regions defining a number of cross sections generally increasing in cross-sectional area in a direction toward said outlet-opening section;
said outlet-opening section comprising an outlet opening having a substantially elongated-like shape;
each said cross section of each said region of similar cross-sectional shapes being defined by a width "x" and a height "y"; the "x" dimension of at least most of said cross sections of said plurality of similar cross-sectional shapes increasing in value along the "z" direction toward said outlet opening, and the "y" dimension of at least most of said cross sections of said plurality of regions of similar cross-sectional shapes decreasing in value along the "z" direction toward said outlet opening.

10. The dispensing nozzle according to claim 9, wherein said plurality of regions of different cross-sectional shapes comprise a first series of elliptical cross-sectional shapes and a second series of elongated-like cross-sectional shapes that continually transform in a direction along said longitudinal axis into said substantially elongated-like shape of said outlet opening.

11. The dispensing nozzle according to claim 9, wherein, along said "z" direction, said plurality of regions of different cross-sectional shapes comprises a first series of circular cross-sectional shapes, a second series of substantially elliptical cross-sectional shapes, and a third series of elongated-like cross-sectional shapes, that continually transform in a direction along said "Z" direction into said substantially elongated-like shape of said outlet opening.

12. The dispensing nozzle according to claim 9, wherein said at least one interior flow passageway comprises a first inlet passageway having a first inlet and a second outlet, a plurality of branch-passageways each having a second inlet connected to said first outlet of said first inlet passageway and a second outlet; each said discharge-passageway of said plurality of discharge-passageways having a third inlet in fluid communication with a said second outlet of a respective said branch-passageway.

13. The dispensing nozzle according to chain 12, wherein said at least one interior flow passageway further comprises a plurality of sub-branch passageways each having a fourth inlet connected to a said second outlet of a respective said branch-passageway, and a fourth outlet connected to a said third inlet of a respective said discharge-passageway, each sold sub-branch passageway providing said fluid communication between a said third inlet of a respective said discharge-passageway and a said second outlet of a respective said branch-passageway.

14. The dispensing nozzle according to claim 13, wherein each said second outlet and each said fourth outlet is an arcuate bent-shaped connector.

15. A dispensing nozzle comprising:
at least one interior flow passageway through which fluid flows;
said at least one interior flow passageway comprising at least one discharge-passageway, said at least one discharge-passageway defining a longitudinal axis along the entire length thereof defined as the "z" axis, and having a main passageway section and an outlet-opening section; said main passageway section comprising a plurality of regions of different cross-sectional shapes each said region having a series of similarly-shaped cross sections, said cross sections of said plurality of regions generally increasing in cross-sectional area in a direction toward said outlet-opening section;
said outlet-opening section comprising an outlet opening having a substantially elongated-like shape;
each said cross section of said plurality of regions of different cross-sectional shapes being defined by a width "x" and a height "y"; the "x" dimension of at least most of said cross-sections of said series of different cross-sectional shapes increasing in value along the "z" direction toward said outlet opening, and said "y" dimension of at least most of said cross-sections of said series of different cross-sectional shapes decreasing in value along the "z" direction toward said outlet opening.

16. The dispensing nozzle according to claim 15, wherein said plurality of regions of different cross-sectional shapes comprise a first series of elliptical cross-sectional shapes and a second series of elongated-like cross-sectional shapes that continually transform in a direction along said longitudinal axis into said substantially elongated-like shape of said outlet opening.

17. The dispensing nozzle according to claim 15, wherein, along said "z" direction, said plurality of regions of different cross-sectional shapes comprise a first series of circular cross-sectional shapes, a second series of substantially elliptical cross-sectional shapes, and a third series of elongated-like cross-sectional shapes, tat continually transform in a direction along said "z" direction into said substantially elongated-like shape of said outlet opening.

18. The dispensing nozzle according to 17, wherein said third series of said plurality of cross-sectional shapes at least partially comprise a plurality of substantially oval-of-Cassini-like cross-sectional shapes.

19. The dispensing nozzle according to claim 15, wherein the difference in the "x" dimension between adjacent said cross sections of at least most of said cross sections is in the approximate range of between 0.001 inch and 0.015 inch.

20. The dispensing nozzle according to claim 19, wherein the difference in the "x" dimension between adjacent said cross sections initially gradually increases for at least most of the cross sections until reaching said maximum of 0.015 inch, and then decreases for at least most of the cross-sections until reaching said minimum of 0.001 inch.

21. The dispensing nozzle according to claim 15, wherein the difference in the "x" dimension between adjacent said cross sections initially gradually increases for at least most of the cross sections until reaching a maximum at an approximately medially located portion of said discharge passageway between the inlet of said of discharge-passageway and said outlet opening, and decreases thereafter from said approximately medially located portion until at least near said outlet opening.

22. The dispensing nozzle according to claim 15, wherein the difference in the "y" dimension between adjacent said crass sections of at least most of said cross sections is in the approximate range of between 0.001 inch and 0.002 inch.

23. The dispensing nozzle according to claim 15, wherein the cross-sectional area of adjacent said cross sections of said main passageway section increases in value in the approximate range of between 0.0001 square inch and 0.0008 square inch.

24. The dispensing nozzle according to claim 15, wherein the difference in cross-sectional area values between adjacent said cross sections of said main passageway section gradually increases to a maximum at a portion of said main passageway section between the inlet thereof and said outlet opening and then gradually decreases in value from said portion of said main passageway section until said outlet opening.

* * * * *